United States Patent
Manzardo

(10) Patent No.: US 7,320,400 B2
(45) Date of Patent: Jan. 22, 2008

(54) CONTAINER AND METHOD OF MAKING A CONTAINER

(75) Inventor: Marcel B. Manzardo, Los Gatos, CA (US)

(73) Assignee: MMDesign Studio International, Inc., Los Gatos, CA (US)

( * ) Notice: Subject to any disclaimer, the term of this patent is extended or adjusted under 35 U.S.C. 154(b) by 249 days.

(21) Appl. No.: 10/937,404

(22) Filed: Sep. 10, 2004

(65) Prior Publication Data

US 2006/0055168 A1 Mar. 16, 2006

(51) Int. Cl.
*B65D 85/57* (2006.01)

(52) U.S. Cl. ............... 206/308.1; 206/311; 206/312; 281/31

(58) Field of Classification Search ............. 206/308.1, 206/311, 312, 232, 307, 307.1; 281/31, 45
See application file for complete search history.

(56) References Cited

U.S. PATENT DOCUMENTS

| | | | |
|---|---|---|---|
| 4,793,477 A * | 12/1988 | Manning et al. | 206/232 |
| 5,207,717 A * | 5/1993 | Manning | 206/232 |
| 5,895,165 A | 4/1999 | Mogelonsky | |
| 5,931,293 A | 8/1999 | Seelenmeyer | |
| 5,947,281 A | 9/1999 | Kaneff | |
| 6,068,117 A | 5/2000 | Koehn | |
| 6,119,381 A | 9/2000 | Grocholski | |
| 6,186,332 B1 | 2/2001 | Combs | |
| 6,279,739 B1 | 8/2001 | Moore et al. | |
| 6,349,822 B1 | 2/2002 | Greene | |
| 6,419,084 B1 | 7/2002 | Sandor | |
| 6,443,300 B1 | 9/2002 | Gelardi | |
| 6,443,301 B2 * | 9/2002 | Garnier | 206/312 |
| 6,450,535 B1 | 9/2002 | Shafer | |
| 6,454,091 B1 | 9/2002 | Mendoza et al. | |
| 6,523,684 B1 | 2/2003 | Daniels, Jr. | |
| 6,626,289 B2 * | 9/2003 | Nagata et al. | 206/307.1 |
| 6,705,472 B2 | 3/2004 | Cross et al. | |
| 6,719,132 B2 * | 4/2004 | Sanders | 206/308.1 |

\* cited by examiner

*Primary Examiner*—Mickey Yu
*Assistant Examiner*—Steven A. Reynolds
(74) *Attorney, Agent, or Firm*—Rissman Jobse Hendricks & Oliverio LLP

(57) ABSTRACT

A container may include a sheet having a first side and a second side. The sheet may be foldable such that a first portion of the first side faces a second portion of the first side. The container may also include a first pocket member connected to the first portion, a second pocket member connected to the second portion, and a third pocket member connected to the second pocket member. The first pocket member and the first portion may cooperate to define a first pocket configured to receive a first portion of printed material. The second pocket member and the second portion may cooperate to define a second pocket configured to receive a second portion of the printed material. The third pocket member and the second pocket member may cooperate to define a third pocket configured to receive at least one media disc.

14 Claims, 4 Drawing Sheets

US 7,320,400 B2

CONTAINER AND METHOD OF MAKING A CONTAINER

TECHNICAL FIELD

The present invention is directed to a container and a method for making a container. More particularly, the present invention is directed to a container for holding one or more media discs and/or printed materials associated with the media discs.

BACKGROUND

Media discs are popular mediums for the storage of movies, music, videos, computer software, computer games, etc. As used herein, the term "media disc" is intended to encompass any digital storage disc, such as compact discs (CDs) for the storage of digitized music and/or video, CD-ROMs for the storage of digitized data and computer software, digital video discs (DVDs) for the storage of digitized audio and video data, video game discs, and other similar disc formats, whether now known or developed in the future. Such media discs are often packaged in a rigid plastic case and are often accompanied by printed material for sale to consumers.

For example, the printed material may include a cover sheet visible from outside the plastic case. The cover sheet may be between a clear plastic cover and the rigid plastic case. Other discs are packaged in a cardboard case rather than plastic, where the printed material is the cardboard case itself. Some media discs are packaged with a booklet or other printed material contained inside the plastic or cardboard case. All of these types of printed material typically include visually attractive color graphics and/or information representative of the content of the media disc. Since a media disc often does not include easily visible graphics identifying the content of the disc, the printed material may serve to provide an easily visible identification of the content of the disc.

Because the rigid cases take up much more space than the media discs and accompanying printed material, they are often considered a nuisance by users. Some conventional systems collect media discs individually into a booklet having vinyl sleeves bound, for example, in a three-ring binder. However, many of these systems do not provide a mechanism for maintaining the accompanying printed material with the media discs. Some systems may allow storage of the accompanying material, but do so in a manner quite dissimilar from the original visual presentation of the packaged media disc. Consequently, there is a need for an improved media disc container that allows the discs and their accompanying printed materials to be stored and displayed in a space-efficient manner while maintaining a visual presentation similar to the originally-packaged media disc.

SUMMARY OF THE INVENTION

In some aspects, a container may include a sheet having a first side and a second side. The sheet may be foldable such that a first portion of the first side faces a second portion of the first side. The container may also include a first pocket member connected to the first portion, a second pocket member connected to the second portion, and a third pocket member connected to the second pocket member. The first pocket member and the first portion may cooperate to define a first pocket configured to receive a first portion of printed material. The second pocket member and the second portion may cooperate to define a second pocket configured to receive a second portion of the printed material. The third pocket member and the second pocket member may cooperate to define a third pocket configured to receive at least one media disc.

In accordance with some aspects, a method of making a container may include providing a sheet having a first side and a second side, wherein the sheet is foldable such that a first portion of the first side faces a second portion of the first side. The method may also include connecting a first pocket member to the first portion to define a first pocket configured to receive a first portion of printed material, connecting a second pocket member to the second portion to define a second pocket configured to receive a second portion of the printed material, and connecting a third pocket member to the second pocket member to define a third pocket configured to receive at least one media disc.

In some aspects, a container may include a sheet having a first side and a second side, first and second pocket members connected to opposite ends of the first side of the sheet, and a third pocket member connected to the second pocket member. The first and second pocket members may cooperate with the sheet to define first and second pockets, respectively, configured to receive opposite ends of printed material, and the third pocket member and the second pocket member may cooperate to define a third pocket configured to receive at least one media disc.

DETAILED DESCRIPTION OF EXEMPLARY EMBODIMENTS

Figure 1:
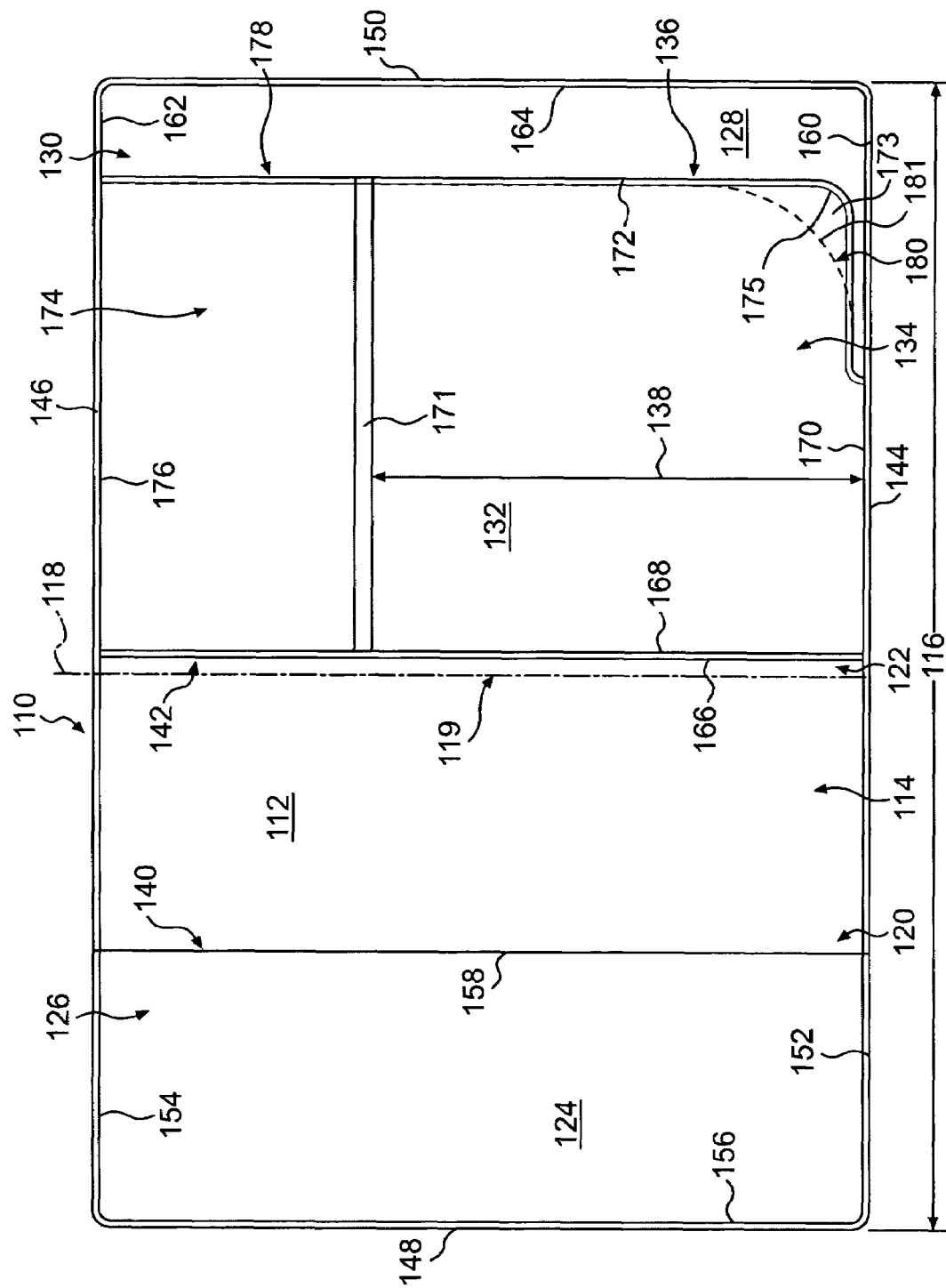
FIG. 1 is a plan view of an exemplary container in accordance with some aspects of the invention.
Figure 2:
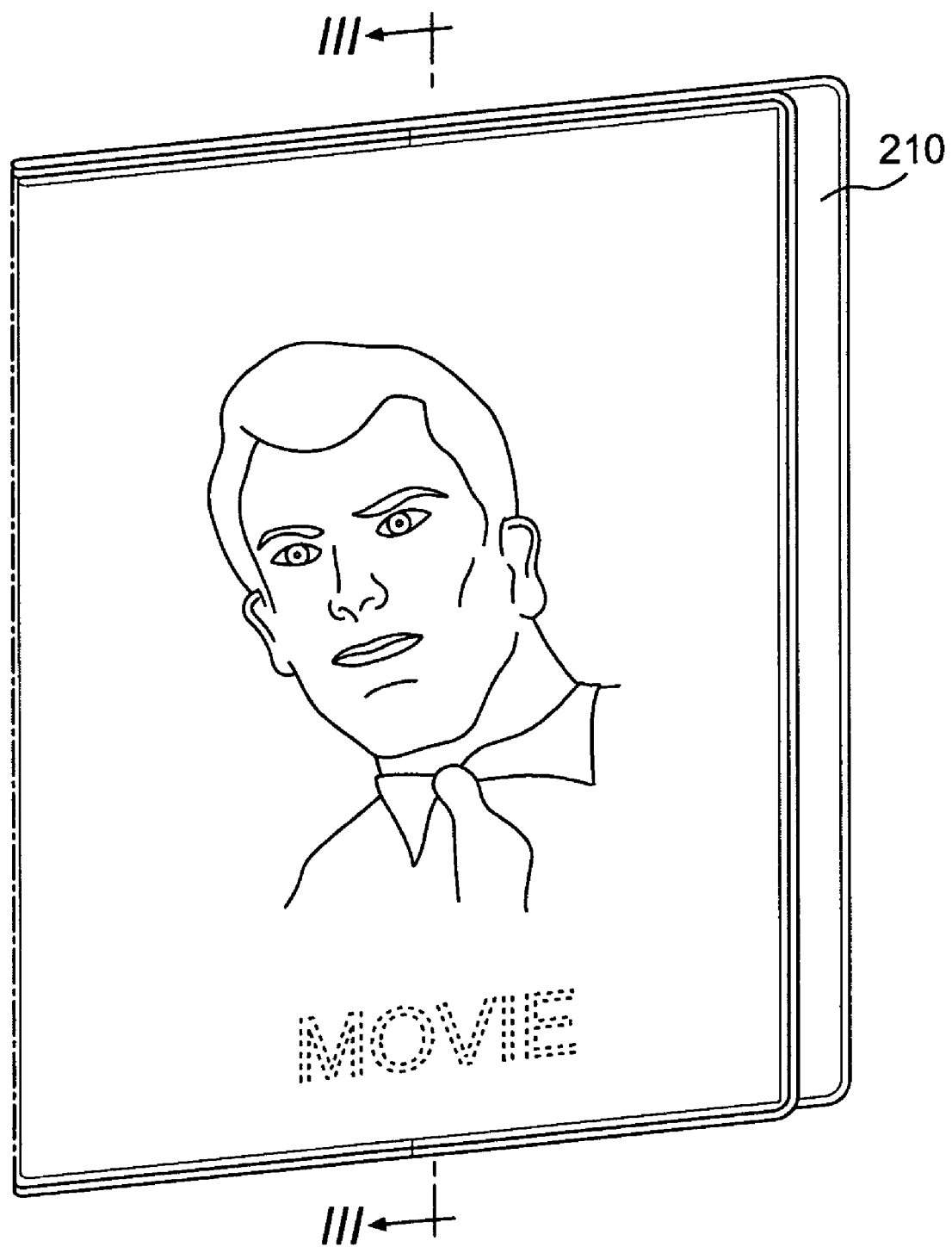
FIG. 2 is a plan view of an exemplary container in a folded configuration with exemplary printed material therein.
Figure 3:
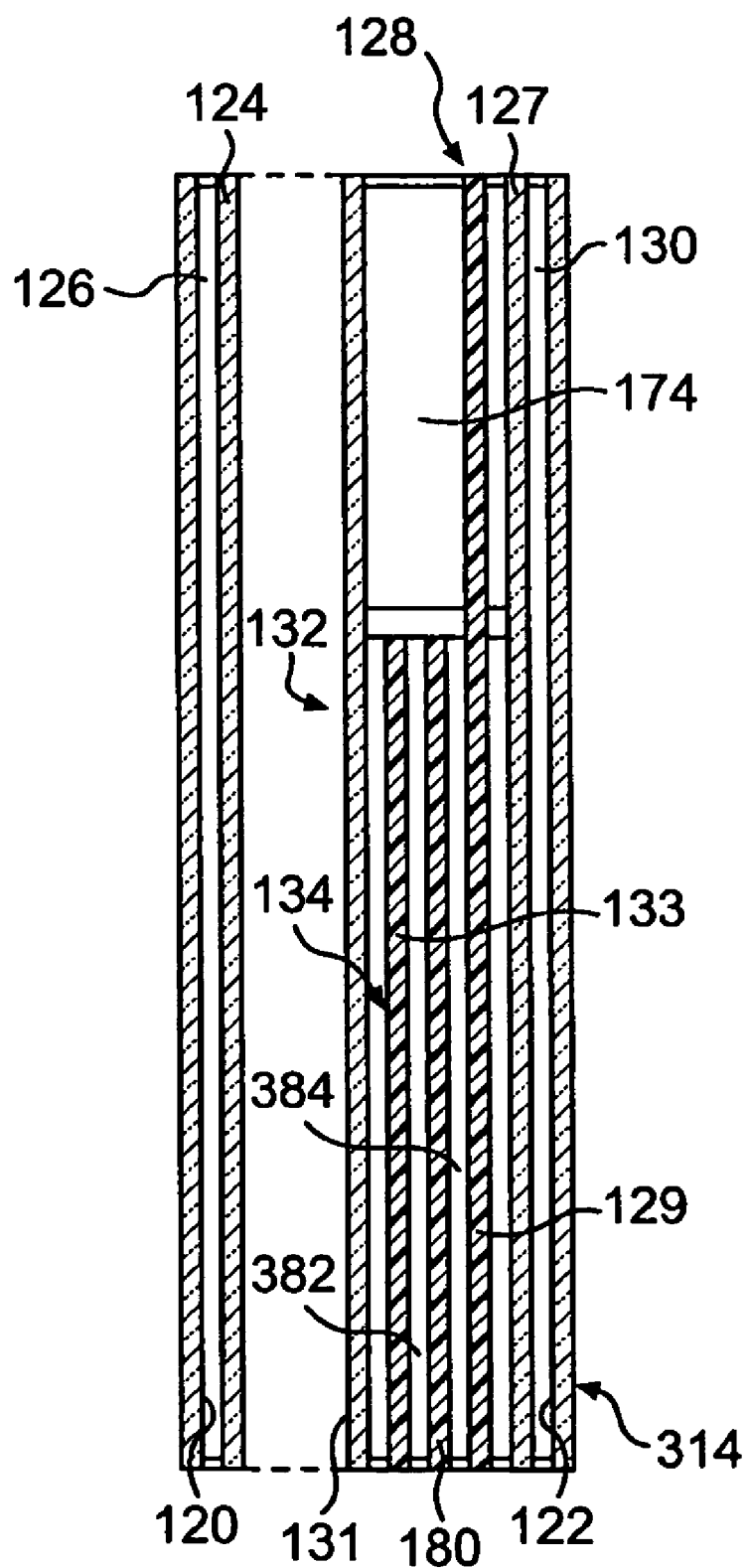
FIG. 3 is a cross-sectional view of the container of FIG. 2, without exemplary printed material therein, taken along line III-III.

An exemplary embodiment of a container 110 is shown in FIG. 1. The container 110 may include a sheet 112 having a first side 114 and a second side 314 (see FIG. 3). The sheet 112 has a longitudinal dimension 116 and may be foldable about an axis 118 substantially perpendicular to the longitudinal dimension 116. The sheet 112 may include a crease 119 created during manufacturing, for example, by scoring, in order to facilitate folding of the sheet about the axis 118. As shown in FIGS. 2 and 3, when the sheet is folded, a first portion 120 of the first side 114 faces a second portion 122 of the first side 114.

The sheet 112 and axis 118 may be sized and/or arranged so as to create a visible overlap 210 of the second portion 122 beyond the first portion 120 when the sheet 112 is folded. As described below, the overlap 210 may facilitate insertion of a media disc(s) into the container 110. The overlap 210 may also be used by a consumer to attach indicia for organizing, cataloguing, or the like.

Referring again to FIG. 1, a first pocket member 124 may be connected to the first portion 120 of the first side 114 of the sheet 112. The first pocket member 124 and the first portion 120 may cooperate to define a first pocket 126.

A second pocket member 128 may be connected to the second portion 122 of the first side 114 of the sheet 112. The second pocket member 128 and the second portion 122 may cooperate to define a second pocket 130. The second pocket member 128 may include one or more sheets 127, 129. For example, the second pocket member 128 may include a sheet 127 of plastic laminate. In some embodiments, the laminate may be, for example, a clear plastic laminate and/or a non-scratch plastic laminate. Additionally or alternatively, the second pocket member 128 may include a sheet 129 of a woven or non-woven fabric material, for example, the sheet 129 may comprise felt, which may or may not comprise wool. In various embodiments, the sheet 129 may define an interior surface of the third pocket 134. It should be appreciated that the second pocket member 128 may include sheet 127 without sheet 129 or vice versa. It should further be appreciated that the sheets 127, 129 may be separate from one another or adhered to at least a portion of one another, for example, by heat sealing, to form a single sheet.

The container 110 may include a third pocket member 132 connected to the second pocket member 128. The third pocket member 132 and the second pocket member 128 may cooperate to define a third pocket 134. The third pocket member 132 may include one or more sheets 131, 133. For example, the third pocket member 132 may include a sheet 131 of plastic laminate. In some embodiments, the laminate may be, for example, a clear plastic laminate and/or a non-scratch plastic laminate. Additionally or alternatively, the third pocket member 132 may include a sheet 133 of a woven or non-woven fabric material, for example, the sheet 133 may comprise felt, which may or may not comprise wool. In various embodiments, the sheet 133 may define an interior surface of the third pocket 134. It should be appreciated that the third pocket member 132 may include sheet 131 without sheet 133 or vice versa. It should further be appreciated that the sheets 131, 133 may be separate from one another or adhered to at least a portion of one another, for example, by heat sealing, to form a single sheet. In some embodiments, the second and/or third pocket member 128, 132 may comprise a sheet of plastic and a sheet of plastic laminate attached to one another, for example, around a peripheral edge, but still remaining as two separate sheets.

Figure 4:
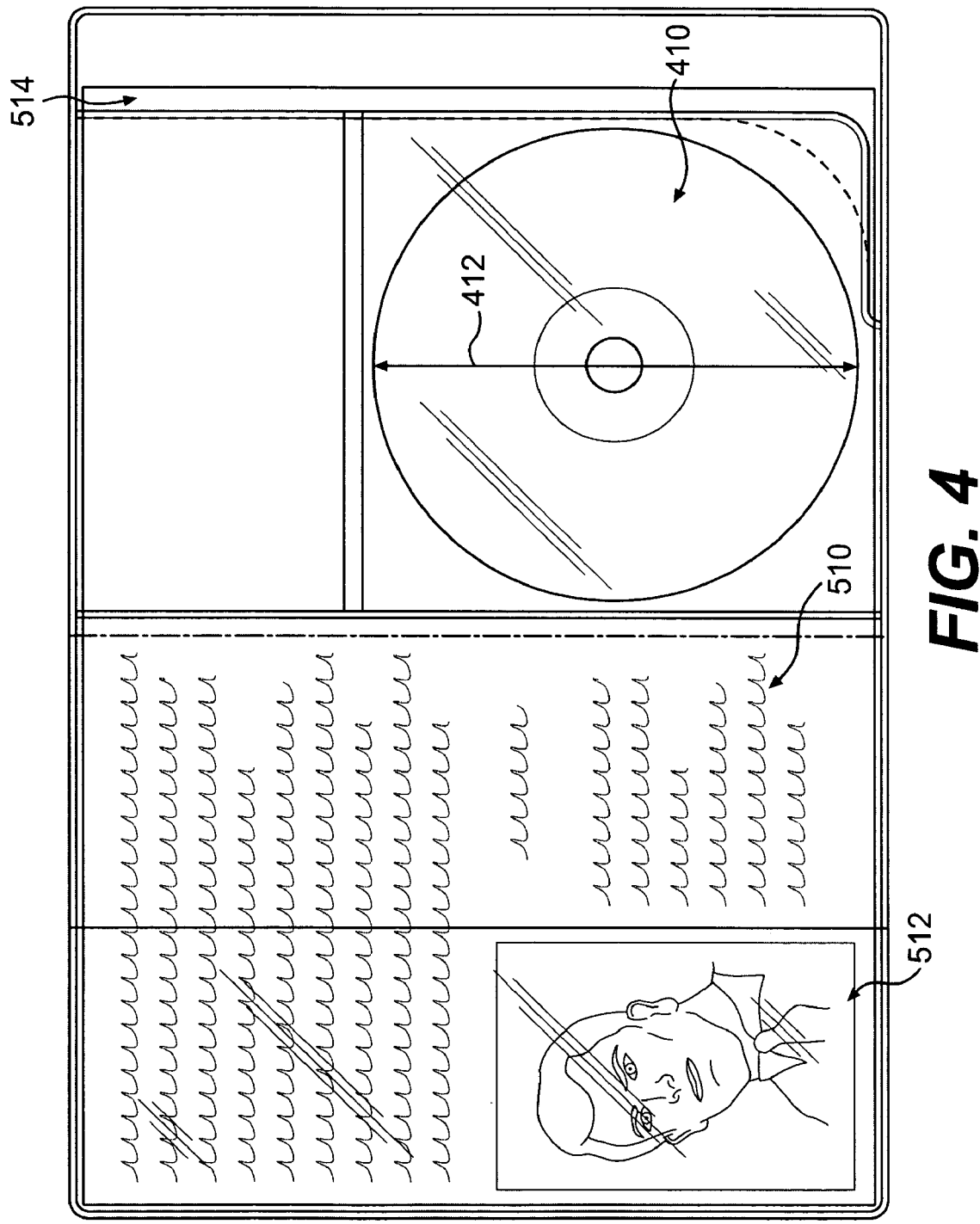
FIG. 4 is a plan view of the container of FIG. 1 with an exemplary media disc and exemplary printed material therein.

The third pocket 134 may include an opening 136 directed away from the fold axis 118. The third pocket 134 may be sized and arranged to receive at least one media disc 410, as shown in FIG. 4. For example, the third pocket 134 may have a dimension 138 in a direction perpendicular to the longitudinal dimension 116 that is sized to substantially correspond to a diameter 412 of the media disc 410. For example, the dimension 138 would have to be slightly larger than the diameter 412 in order to receive the disc 410, but should be close enough in size so that the disc 410 is retained in the pocket 134, for example, via a friction fit, and does not fall out.

The overlap 210 may similarly facilitate insertion of a media disc 410 into the third pocket 134. For example, the third pocket member 132 may be moved relatively away from the overlap 210 and/or a flat surface of a media disc 410 may be placed against a surface of the overlap 210 forming an interior surface of the third pocket 134, and the media disc 410 may be directed into the third pocket 134.

The first and second pockets 126, 130 may include first and second openings 140, 142, respectively, directed toward the fold axis 118. The first and second pockets 126, 130 may cooperate to contain printed material 510 (FIG. 4). As illustrated in FIGS. 1 and 4, the first opening 140 may be sized and arranged to receive a first portion 512 of the printed material 510, and the second opening 142 may be sized and arranged to receive a second portion 514 of the printed material 510. The printed material 510 may include, for example, a paper dvd cover insert, a cardboard dvd cover, and/or a booklet accompanying a dvd.

The sheet 112 may include first and second opposite longitudinal side edges 144, 146 and first and second opposite end edges 148, 150. The first pocket member 124 may include first and second edges 152, 154 attached to a portion of the first and second side edges 144, 146 of the sheet and a third edge 156 attached to the first end edge 148 of the sheet 112. The first pocket member 124 may include a fourth edge 158 opposite to the third edge 156 of the first pocket member 124. The fourth edge 158 may be free of the sheet 112 to define the opening 140 to the first pocket 126 directed away from the first end edge 148 of the sheet 112.

The second pocket member 128 may include first and second edges 160, 162 attached to a portion of the first and second side edges 144, 146 of the sheet 112 and a third edge 164 attached to the second end edge 150 of the sheet 112. The second pocket member 128 may include a fourth edge 166 opposite to the third edge 164 of the second pocket member 128. The fourth edge 166 of the second pocket member 128 may be free of the sheet 112 to define the opening 142 to the second pocket 130 directed away from the second end edge 150 of the sheet 112.

The third pocket member 132 may include first and second edges 168, 170. The first edge 168 of the third pocket member 132 may include a portion attached to a portion of the fourth edge 166 of the second pocket member 128. The second edge 170 may include a portion attached to either the first or the second edge 144, 146 of the second pocket member 128. A region 171 of the third pocket member 132 may be attached to the second pocket member 128 in a direction of said longitudinal dimension 116. The third pocket member 132 may include a third edge 172 opposite to the first edge 168 of the third pocket member 132. A portion of the third edge 172 of the third pocket member 132 may be free of the second pocket member 128 to define the opening 136 to the third pocket 134. The opening 136 to the third pocket 134 may be directed away from the opening 142 to the second pocket 130 and toward the second end edge 150 of the sheet 112. An unattached portion of the second edge 170 and the free third edge 172 may define a flap 173, which may facilitate insertion of a media disc 410 into the third pocket 134.

In some embodiments, the second and third pocket members 128, 132 cooperate to define a fourth pocket 174. The fourth pocket 174 may be delimited by a second portion of the first edge 168 of the third pocket member 132 attached to a second portion of the fourth edge 166 of the second pocket member 128, the region of the third pocket member 132 attached to the second pocket member 128, and a fourth edge 176 of the third pocket member 132 attached to the edge of the second pocket member 128 opposite to the second edge 170 of the third pocket member 132 (i.e., the first or second edge 144, 146 of the second pocket member 128). For example, if the third pocket 134 is at the bottom of the sheet 112, as shown in the figures, the fourth pocket is at the top of the sheet 112, and vice versa. The third edge 172 of the third pocket member 132 may be free of the second pocket member 128 to define an opening 178 to the fourth pocket 174 directed away from the opening 142 to the second pocket 130 and toward the second end edge 150 of the sheet 112. The fourth pocket 174 may be used to store various media-related graphics, reviews, or business cards, or any desired miscellaneous items sized to fit in the fourth pocket 174.

In some embodiments, the container may include a second sheet 180 sandwiched between the second and third pocket members 128, 132. The second sheet 180 may be attached to the second pocket member 128 in one or more of the same regions that the third pocket member 132 is attached to the second pocket member 128. The second sheet 180 may divide the third pocket 134 into two sub-pockets 382, 384, with each of the sub-pockets being sized and arranged to receive a media disc. The second sheet 180 may be, for example, a plastic laminate, a non-woven fabric material, or a woven fabric material. The plastic laminate may be, for example, a non-scratch plastic laminate. The non-woven fabric material may be, for example, felt, which may or may not comprise wool.

In various embodiments, the second sheet 180 may include a curved free edge 181, and the flap 173 may include a curved free edge 175. The curved free edges 181, 175 may be offset from one another and/or may have different radii of curvature in order to facilitate insertion of a media disc 410 into sub-pocket 382. For example, the flap 173 may be moved relatively away from the second sheet 180 and/or a flat surface of a media disc 410 may be placed against a surface of the flap 173 forming an interior surface of the sub-pocket 382, and the media disc 410 may be directed into the sub-pocket 382. The overlap 210 may similarly facilitate insertion of a media disc 410 into the sub-pocket 384. For example, the flap 173 and second sheet 180 may be moved relatively away from the overlap 210 and/or a flat surface of a media disc 410 may be placed against a surface of the overlap 210 forming an interior surface of the sub-pocket 384, and the media disc 410 may be directed into the sub-pocket 384.

In making the container 110, the first and second pocket members 124, 128 may be attached to the sheet 112 by, for example, heat sealing, and/or the third pocket member 132 may be attached to the second pocket member by, for example, heat sealing.

It should be appreciated that the container 110 may be used to contain, display, and/or store one or more media discs 410 such as, for example, CDs, video CDs, CD-ROMs, DVDs, and/or video game discs. It should also be appreciated that the container 110 may be used to contain, display, and/or store printed material associated with the one or more media discs 410. The printed material 510 may include, for example, a cardboard media disc cover, a paper cover sheet, and/or an informational booklet.

In one exemplary use of the container 110, the second portion 514 of the printed material 510 may be inserted into the second pocket 130 via the second opening 142. The first portion 512 of the printed material 510 may be inserted into the first pocket 126 via the first opening 140. The first portion 512 may be, for example, the front portion of the cover sheet of an originally-packaged media disc, and the second portion 514 may be, for example, the back portion of the cover sheet of an originally-packaged media disc. One or more media discs 410 may be inserted into the third pocket 134 via the opening 136. In one aspect of the container 110 that may include a second sheet 180 defining sub-pockets 382, 384, one or more media discs 410 may be inserted into one sub-pocket 382 and one or more media discs 410 may be inserted into the other sub-pocket 384. One skilled in the art should recognize that the order of inserting the discs and/or printed material may be varied as desired by the user.

It should be appreciated that as long as the interior surfaces of the third pocket 134 comprise a fabric material or a non-scratch laminate, the orientation of the media disc in the third pocket 134 is reversible. For example, if the media disc contains information on only one side of the disc ("one-sided" disc), that surface of the disc (and thus the information stored thereon) will be protected regardless of which interior surface of the third pocket 134 it faces. Further, both surfaces of a media disc containing information on both sides ("two-sided" disc) will also be protected by the interior surfaces of the third pocket 134. In embodiments having the third pocket 134 divided into two sub-pockets 382, 384 by the second sheet 180, which comprises a fabric material or a non-scratch laminate, the information surface of one-sided discs will be protected regardless of the orientation of the discs 410 in the sub-pockets 382, 384, and both sides of two-sided discs will be protected.

It should also be appreciated that a booklet may be placed in the container 110 in a manner similar to the cover-type materials. For example, the cover sheet of a booklet may be inserted in the first pocket 126 via the first opening 140, and the back sheet of a booklet may be inserted into the second pocket 130 via the second opening 142.

It should be appreciated that the sheet 112 and the first and second pockets 128, 132 may be sized and arranged to accommodate the paper cover sheets, informational booklets, and the cardboard media disc covers, which are typically larger than the paper cover sheets and booklets. When containing the paper cover sheets and the cardboard media disc covers, the user may position their spine so that it will be visible from the front of the container 110, as viewed in FIG. 2.

It should be appreciated that a plurality of exemplary containers 110 may be stored and/or displayed in various ways. For example, the containers may be stored in a covered housing, an open tray, or the like. In one aspect, each container 110 may be inserted into an adaptor (not shown) for compilation in a binder or the like. For example, the adaptor may include holes arranged for alignment with 2-ring binders, 3-ring binders, and/or the like. In one aspect, the adaptor may be sized and arranged to receive the container 110 in a folded configuration, as shown in FIG. 2. The adaptor may comprise a sleeve with three sealed edges and an open edge for receiving the container 110. For example, the adaptor may receive the end of the folded container 110 including the fold axis 118.

It will be apparent to those skilled in the art that various modifications and variations can be made to the container and method of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A container, comprising:
a sheet having a first side and a second side, the sheet being foldable such that a first portion of the first side faces a second portion of the first side, the sheet having a longitudinal dimension including first and second opposite longitudinal side edges and first and second opposite end edges;
a first pocket member connected to said first portion, the first pocket member and the first portion cooperating to define a first pocket configured to receive a first portion of printed material, the first pocket member including first and second edges attached to a portion of said first and second side edges of the sheet,
a third edge attached to the first end edge of the sheet, and
a fourth edge opposite to the third edge of the first pocket member, the fourth edge being free of the sheet to define an opening to said first pocket;
a second pocket member connected to said second portion, the second pocket member and the second portion cooperating to define a second pocket configured to receive a second portion of the printed material, the second pocket member including
first and second edges attached to a portion of said first and second side edges of the sheet,
a third edge attached to the second end edge of the sheet, and
a fourth edge opposite to the third edge of the second pocket member, the fourth edge of the second pocket member being free of the sheet to define an opening to said second pocket; and
a third pocket member connected to the second pocket member, the third pocket member and the second pocket member cooperating to define a third pocket configured to receive at least one media disc, the third pocket member including a portion of a first edge attached to a portion of the fourth edge of the second pocket member, a portion of a second edge attached to one of the first and second edges of the second pocket member, and a region attached to the second pocket member in a direction of said longitudinal dimension.

2. The container of claim 1, wherein the third pocket member includes a third edge opposite to the first edge of the third pocket member, the third edge of the third pocket member being free of the second pocket member to define an opening to the third pocket.

3. The container of claim 2, wherein the opening to the third pocket is directed away from the opening to the second pocket and toward the second end edge of the sheet.

4. The container of claim 1, wherein the second and third pocket members cooperate to define a fourth pocket, the fourth pocket being delimited by a second portion of the first edge of the third pocket member attached to a second portion of the fourth edge of the second pocket member, said region attached to the second pocket member, and a third edge of the third pocket member attached to the other one of said first and second edges of the second pocket member.

5. The container of claim 4, wherein third edge of the third pocket member defines an opening to the fourth pocket directed away from the opening to the second pocket and toward the second end edge of the sheet.

6. A container, comprising:
a sheet having a first side and a second side;
first and second pocket members connected to opposite ends of the first side of the sheet, the first and second pocket members cooperating with the sheet to define first and second pockets configured to receive opposite ends of printed material; and
a third pocket member connected to the second pocket member, the third pocket member and the second pocket member cooperating to define a third pocket configured to receive at least one media disc, the third pocket member comprising
a first edge connected with an edge of the second pocket member, the first edge and said edge of the second pocket member cooperating to form a closed end of the third pocket,
a second edge opposite to the first edge, the second edge being free from the second pocket member and defining an opening to the third pocket, and
a third edge extending between the first and second edges, the third edge having a portion attached to the second pocket member and a portion free from the second pocket member, said free portion being continuous with said second edge.

7. The container of claim 6, wherein the sheet is foldable along an axis substantially perpendicular to a longitudinal dimension of the sheet.

8. The container of claim 7, wherein said opening to the third pocket is directed away from said fold axis.

9. The container of claim 7, wherein the first and second pockets each have an opening, said openings facing the fold axis.

10. The container of claim 6, further comprising a second sheet sandwiched between the second and third pocket members, the second sheet dividing the third pocket into two sub-pockets, each of the sub-pockets being configured to receive a media disc.

11. The container of claim 10, wherein the second sheet comprises a non-woven fabric material.

12. The container of claim 6, wherein at least one of the first, second, and third pocket members comprises a plastic laminate.

13. The container of claim 6, wherein at least one of the second and third pocket members comprises a non-scratch laminate.

14. The container of claim 6, wherein at least one of the second and third pocket members comprises a non-woven material defining an interior surface of the third pocket.

* * * * *